United States Patent
Herbig et al.

(10) Patent No.: US 10,227,857 B2
(45) Date of Patent: Mar. 12, 2019

(54) MODELING AND SIMULATION OF COMPLETE DRILL STRINGS

(75) Inventors: Christian Herbig, Lower Saxony (DE); Hanno Reckmann, Nienhagen (DE); Bernhard Meyer-Heye, Bremen (DE); Frank Schuberth, Celle (DE); Jayesh Rameshlal Jain, The Woodlands, TX (US); Jonathan Mackey Hanson, Salt Lake City, UT (US); Carmel Zouheir El Hakam, Houston, TX (US); Reed W. Spencer, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 13/220,087

(22) Filed: Aug. 29, 2011

(65) Prior Publication Data
US 2013/0054203 A1    Feb. 28, 2013

(51) Int. Cl.
*G06G 7/48* (2006.01)
*E21B 44/00* (2006.01)
(Continued)

(52) U.S. Cl.
CPC ............. *E21B 44/00* (2013.01); *E21B 47/12* (2013.01); *G01V 99/005* (2013.01);
(Continued)

(58) Field of Classification Search
None
See application file for complete search history.

(56) References Cited

U.S. PATENT DOCUMENTS 5,595,254 A * 1/1997 Tibbitts ................. E21B 7/064
                                                        175/320
5,787,022 A * 7/1998 Tibbitts et al. .................. 703/7
(Continued)

FOREIGN PATENT DOCUMENTS

CA    2340547 A1    9/2001
CA    2522162 A1    9/2001
(Continued)

OTHER PUBLICATIONS

Tucker, W. R., and Charles Wang. "An integrated model for drill-string dynamics." Journal of sound and vibration 224.1 (1999): 123-165.*

(Continued)

*Primary Examiner* — Saif A Alhija
*Assistant Examiner* — Nithya J. Moll
(74) *Attorney, Agent, or Firm* — Cantor Colburn LLP

(57) ABSTRACT

A method of predicting behavior of a drilling assembly includes: generating a mathematical representation of a geometry of each of a plurality of components of a drilling assembly, the plurality of components including a plurality of cutters and one or more additional components configured to at least one of: support the plurality of cutters and operably connect the plurality of cutters to the drill string, the one or more additional components including a drill bit crown; simulating one or more operating conditions incident on the drilling assembly representation, and simulating an interaction between the plurality of components and an earth formation; and predicting physical responses of the drilling assembly representation to the one or more conditions.

16 Claims, 7 Drawing Sheets

(51) Int. Cl.
*G01V 99/00* (2009.01)
*E21B 47/12* (2012.01)
*G06F 17/30* (2006.01)
*G06T 17/05* (2011.01)

(52) U.S. Cl.
CPC ........ *G06F 17/30241* (2013.01); *G06T 17/05* (2013.01); *G01V 2210/66* (2013.01)

(56) References Cited

U.S. PATENT DOCUMENTS

| | | |
|---|---|---|
| 6,276,465 B1 * | 8/2001 | Cooley et al. ............ 175/24 |
| 6,516,293 B1 | 2/2003 | Huang et al. |
| 6,612,382 B2 * | 9/2003 | King ............................. 175/40 |
| 6,785,641 B1 | 8/2004 | Huang |
| 6,873,947 B1 | 3/2005 | Huang et al. |
| 7,020,597 B2 | 3/2006 | Oliver et al. |
| 7,139,689 B2 | 11/2006 | Huang |
| 7,251,590 B2 | 7/2007 | Huang et al. |
| 7,260,514 B2 | 8/2007 | Huang |
| 7,356,450 B2 | 4/2008 | Huang |
| 7,426,459 B2 | 9/2008 | Huang |
| 7,464,013 B2 | 12/2008 | Huang et al. |
| 7,693,695 B2 | 4/2010 | Huang et al. |
| 7,729,750 B2 | 6/2010 | Tromberg et al. |
| 8,214,188 B2 * | 7/2012 | Bailey et al. ............ 703/10 |
| 2003/0195733 A1 | 10/2003 | Huang et al. |
| 2004/0143427 A1 | 7/2004 | Huang et al. |
| 2004/0211596 A1 | 10/2004 | Huang |
| 2004/0230413 A1 * | 11/2004 | Chen ............................ 703/10 |
| 2005/0010382 A1 | 1/2005 | Oliver et al. |
| 2005/0015229 A1 | 1/2005 | Huang |
| 2005/0080595 A1 | 4/2005 | Huang |
| 2005/0096847 A1 | 5/2005 | Huang |
| 2005/0133272 A1 | 6/2005 | Huang et al. |
| 2005/0154568 A1 | 7/2005 | Huang |
| 2005/0159937 A1 | 7/2005 | Huang |
| 2005/0165589 A1 | 7/2005 | Huang |
| 2005/0165592 A1 | 7/2005 | Huang |
| 2005/0273301 A1 | 12/2005 | Huang |
| 2005/0273302 A1 | 12/2005 | Huang et al. |
| 2005/0273304 A1 | 12/2005 | Oliver et al. |
| 2006/0149518 A1 | 7/2006 | Oliver et al. |
| 2006/0184043 A1 | 8/2006 | Tromberg et al. |
| 2006/0195307 A1 | 8/2006 | Huang et al. |
| 2007/0005316 A1 | 1/2007 | Paez |
| 2007/0021857 A1 | 1/2007 | Huang |
| 2007/0067147 A1 | 3/2007 | Huang |
| 2007/0192071 A1 | 8/2007 | Huang et al. |
| 2007/0192074 A1 | 8/2007 | Chen |
| 2008/0255817 A1 | 10/2008 | Pabon et al. |
| 2009/0055135 A1 | 2/2009 | Tang et al. |
| 2010/0211362 A1 | 8/2010 | Huang et al. |

FOREIGN PATENT DOCUMENTS

| | | |
|---|---|---|
| CA | 2358618 A1 | 4/2002 |
| CA | 2531397 A1 | 1/2005 |
| CA | 2531717 A1 | 1/2005 |
| CA | 2536684 A1 | 1/2005 |
| CA | 2536695 A1 | 1/2005 |
| CA | 2567656 A1 | 12/2005 |
| CA | 2541478 A1 | 10/2006 |
| CA | 2582200 | 9/2007 |
| CA | 2582200 A1 | 9/2007 |
| CA | 2598801 A1 | 1/2008 |
| CA | 2672506 | 1/2010 |
| EP | 1845853 | 10/2007 |
| GB | 2360304 A | 9/2001 |
| GB | 2367843 A | 4/2002 |
| GB | 2370059 A | 6/2002 |
| GB | 2370060 A | 6/2002 |
| GB | 2414315 A | 11/2005 |
| GB | 2419014 A | 4/2006 |
| GB | 2419015 A | 4/2006 |
| GB | 2420203 A | 5/2006 |
| GB | 2420862 A | 6/2006 |
| GB | 2424975 A | 10/2006 |
| GB | 2435706 A | 9/2007 |
| GB | 2436451 A | 9/2007 |
| GB | 2441436 A | 3/2008 |
| GB | 2462003 A | 1/2010 |
| NO | 20065753 | 2/2007 |
| WO | 2005008019 A1 | 1/2005 |
| WO | 2005008020 A1 | 1/2005 |
| WO | 2005008021 A1 | 1/2005 |
| WO | 2005008022 A1 | 1/2005 |
| WO | 2005114542 A2 | 12/2005 |
| WO | 2006078973 A2 | 7/2006 |

OTHER PUBLICATIONS

Notification of Transmittal of the International Search Report and the Written Opinion of the International Searching Authority, or the Declaration; PCT/US2012/052082; dated Jan. 29, 2013.

Tucker, et al. "An Integrated Model for Drill-String Dynamics". Dept. of Physics, Lancaster University, May 7, 2000. 83 pages.

Hanson, et al.; "Dynamics Modeling of PDC Bits"; SPE/IADC Drilling Conference held in Amsterdam, Feb. 28-Mar. 2, 1995; SPE/IADC 29401; 16 pgs.

Dykstra, et al.; Improving Drilling Performance by Applying Advanced Dynamics Models; SPE/IADC Drilling Conference held in Amsterdam, The Netherlands, Feb. 27- Mar. 1, 2001; SPE/IADC 67697; 18 pgs.

* cited by examiner

MODELING AND SIMULATION OF COMPLETE DRILL STRINGS

BACKGROUND OF THE INVENTION

1. Field of the Invention

This invention relates to drill strings. More specifically, the invention relates to apparatus and methods for modeling the dynamic behavior of the drill strings.

2. Description of the Related Art

Various types of drill strings are deployed in a borehole for exploration and production of hydrocarbons. A drill string generally includes drill pipe and a bottom hole assembly. The bottom hole assembly contains drill collars, which may be instrumented, and can be used to obtain measurements-while-drilling or while logging, for example.

While deployed in the borehole, the drill string may be subject to a variety of forces or loads. Because the drill string is in the borehole, the loads are unseen and can affect the dynamic behavior of the drill string. An immediate result of the unseen loads may be unknown. If the loads are detrimental, then continued operation of the drill string might cause damage or unreliable operation.

Testing of the drill string may be performed to simulate the loads affecting the drill string and model drill bits. However, such modeling may not be able to completely predict the behavior of the drill string in its entirety.

BRIEF SUMMARY OF THE INVENTION

A method of predicting behavior of a drilling assembly includes: generating a mathematical representation of a geometry of each of a plurality of components of a drilling assembly, the plurality of components including a plurality of cutters and one or more additional components configured to at least one of: support the plurality of cutters and operably connect the plurality of cutters to the drill string, the one or more additional components including a drill bit crown; simulating one or more operating conditions incident on the drilling assembly representation, and simulating an interaction between the plurality of components and an earth formation; and predicting physical responses of the drilling assembly representation to the one or more conditions.

A computer program product for predicting behavior of a drill string assembly includes a tangible storage medium readable by a processing circuit and storing instructions for execution by the processing circuit for performing a method. The method includes: generating a mathematical representation of a geometry of each of a plurality of components of a drilling assembly, the plurality of components including a plurality of cutters and one or more additional components configured to at least one of: support the plurality of cutters and operably connect the plurality of cutters to the drill string, the one or more additional components including a drill bit crown; simulating one or more operating conditions incident on the drilling assembly representation, and simulating an interaction between the plurality of components and an earth formation; and predicting physical responses of the drilling assembly representation to the one or more conditions.

A system for estimating a behavior of a drilling assembly during a drilling operation includes a drilling assembly including at least a drill bit connected to a drill string, the drilling assembly configured to be disposed in a borehole; a plurality of sensors operatively associated with the drilling assembly; and a processor in communication with the plurality of sensors. The processor is configured to: generate a mathematical representation of a geometry of each of a plurality of components of a drilling assembly, the plurality of components including a plurality of cutters and one or more additional components configured to at least one of: support the plurality of cutters and operably connect the plurality of cutters to the drill string, the one or more additional components including a drill bit crown; simulate one or more operating conditions incident on the drilling assembly representation, and simulate an interaction between the plurality of components and a formation; and predict physical responses of the drilling assembly representation to the one or more conditions.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Disclosed are exemplary techniques for estimating or predicting the dynamic behavior of a drilling assembly and/or a static parameter associated with the drilling assembly. The techniques, which include systems and methods, use a mathematical model of a drilling assembly, which simulates the forces and loads experienced by the drill string assembly in a downhole environment, as well as interactions between the drilling assembly with the borehole environment (e.g., the borehole wall, casing, formation materials and/or borehole fluid). In one embodiment, methods and associated software are provided for generating a mathematical model (e.g., a finite element model) of the drilling assembly, to provide a complete model of various components of the drilling assembly and simulate interaction between components of the assembly and the borehole environment. The methods include modeling components between the drill bit cutters and the drill string, such as the crown, body, gage and others, and modeling the interaction of these components with the borehole environment. The components may include structural components for supporting the drill bit and cutters, as well as for coupling the drill bit to the drill string. The model may include additional components such as a reamer, reamer cutter(s) and a reamer body component. In one embodiment, the model analysis is performed using a time domain analysis of the model.

Figure 1:
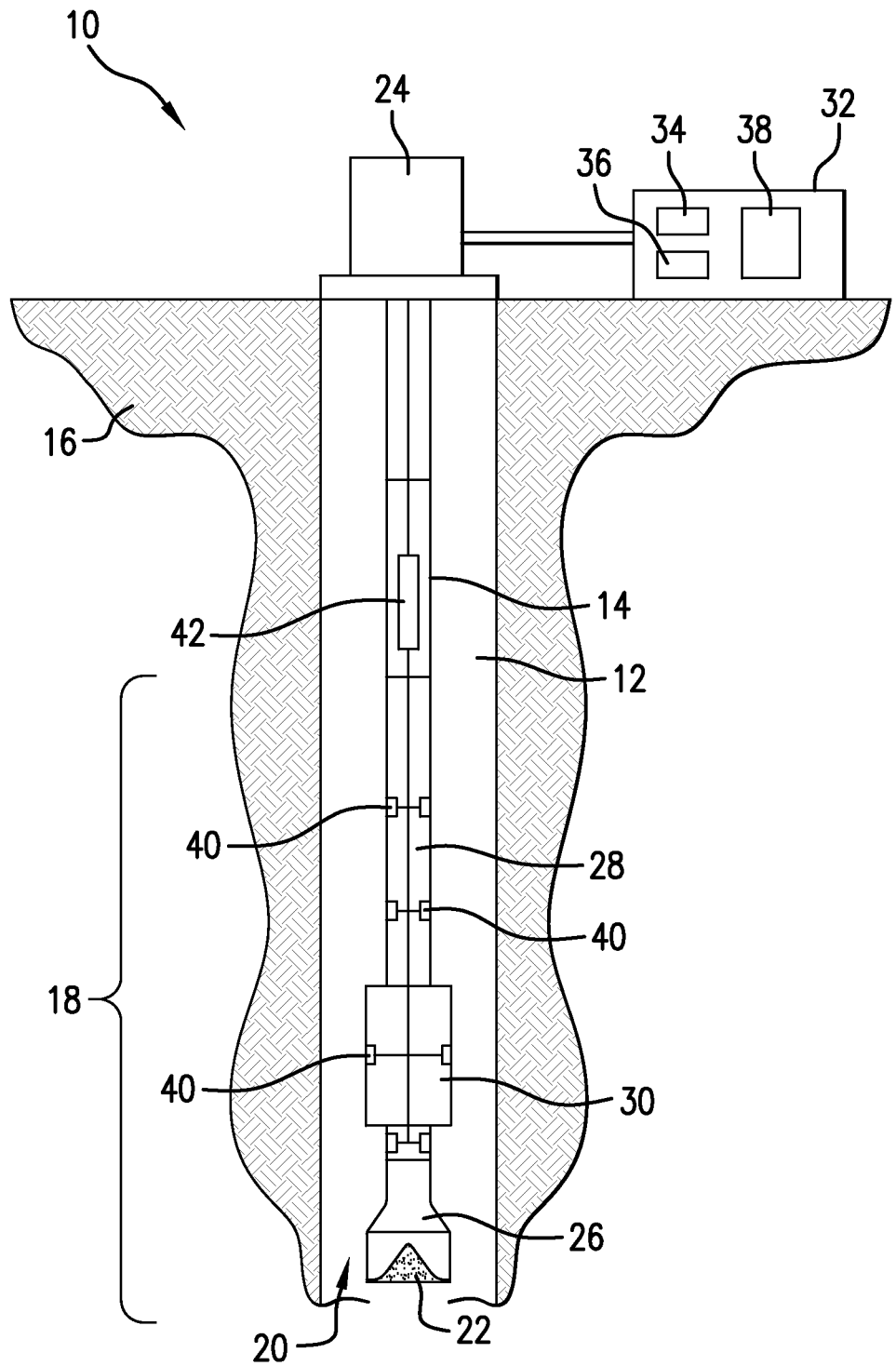
FIG. 1 is an exemplary embodiment of a drilling system including a drill string disposed in a borehole in an earth formation.

Referring to FIG. 1, an exemplary embodiment of a downhole drilling system 10 disposed in a borehole 12 is shown. A drill string 14 is disposed in the borehole 12, which penetrates at least one earth formation 16. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe or multiple pipe sections. The system 10 and/or the drill string 14 include a drilling assembly 18. Various measurement tools may also be incorporated into the system 10 to affect measurement regimes such as wireline measurement applications or logging-while-drilling (LWD) applications.

The drilling assembly 18, which may be configured as a bottomhole assembly (BHA), includes a drill bit 20 that is attached to the bottom end of the drill string 14 via various drilling assembly components. The drilling assembly 18 is configured to be conveyed into the borehole 12 from a drilling rig 24. The drilling assembly components includes various components that provide structural and operational support to the drill bit 20 and to drill bit cutters 22, as well as operably connect the drill bit 20 and the cutters 22 to the drill string 14. Exemplary drilling assembly components include a drill bit body 26 operably connected to the cutters 22, a drilling motor 28 (also referred to as a mud motor), and a stabilizer or reamer 30.

A processing unit 32 is connected in operable communication with the drilling assembly 18 and may be located, for example, at a surface location, a subsea location and/or a surface location on a marine well platform or a marine craft. The processing unit 32 may also be incorporated with the drill string 14 or the drilling assembly 18, or otherwise disposed downhole as desired. The processing unit 32 may be configured to perform functions such as controlling the drilling assembly 18, transmitting and receiving data, processing measurement data, monitoring the drilling assembly 18, and performing simulations of the drilling assembly 18 using mathematical models. The processing unit 32, in one embodiment, includes a processor 34, a data storage device (or a computer-readable medium) 36 for storing, data, models and/or computer programs or software 38.

In one embodiment, the drill bit 20 and/or drilling assembly 18 includes one or more sensors 40 and related circuitry for estimating one or more parameters relating to the drilling assembly 18. For example, a distributed sensor system (DSS) is disposed at the drilling assembly 18 and includes a plurality of sensors 40. The sensors 40 perform measurements associated with the dynamic motion of the drilling assembly 18 and/or the drill string 14 or a static parameter associated therewith, and may also be configured to measure environmental parameters such as temperature and pressure. Non-limiting example of measurements performed by the sensors include accelerations, velocities, distances, angles, forces, moments, and pressures. As one example of distribution of sensors, the sensors may be distributed throughout a drill string and tool (such as a drill bit) at the distal end of the drill string 14. In one embodiment, the sensors 40 are coupled to a downhole electronics unit 42, which may receive data from the sensors 40 and transmit the data to a processing system such as the processing unit 32. Various techniques may be used to transmit the data to the processing unit 32, such as mud pulse, electromagnetic, acoustic telemetry, or wired pipe.

As used herein, "dynamic motion" relates to a change in steady-state motion of the drill string. Dynamic motion can include vibrations and resonances. The term "static parameter" relates to a parameter associated with a drill string. The static parameter is generally a physical condition experienced by the drill string. Non-limiting examples of the static parameter include a displacement, a force or load, a moment (e.g., torque or bending moment), or a pressure.

Figure 2A:
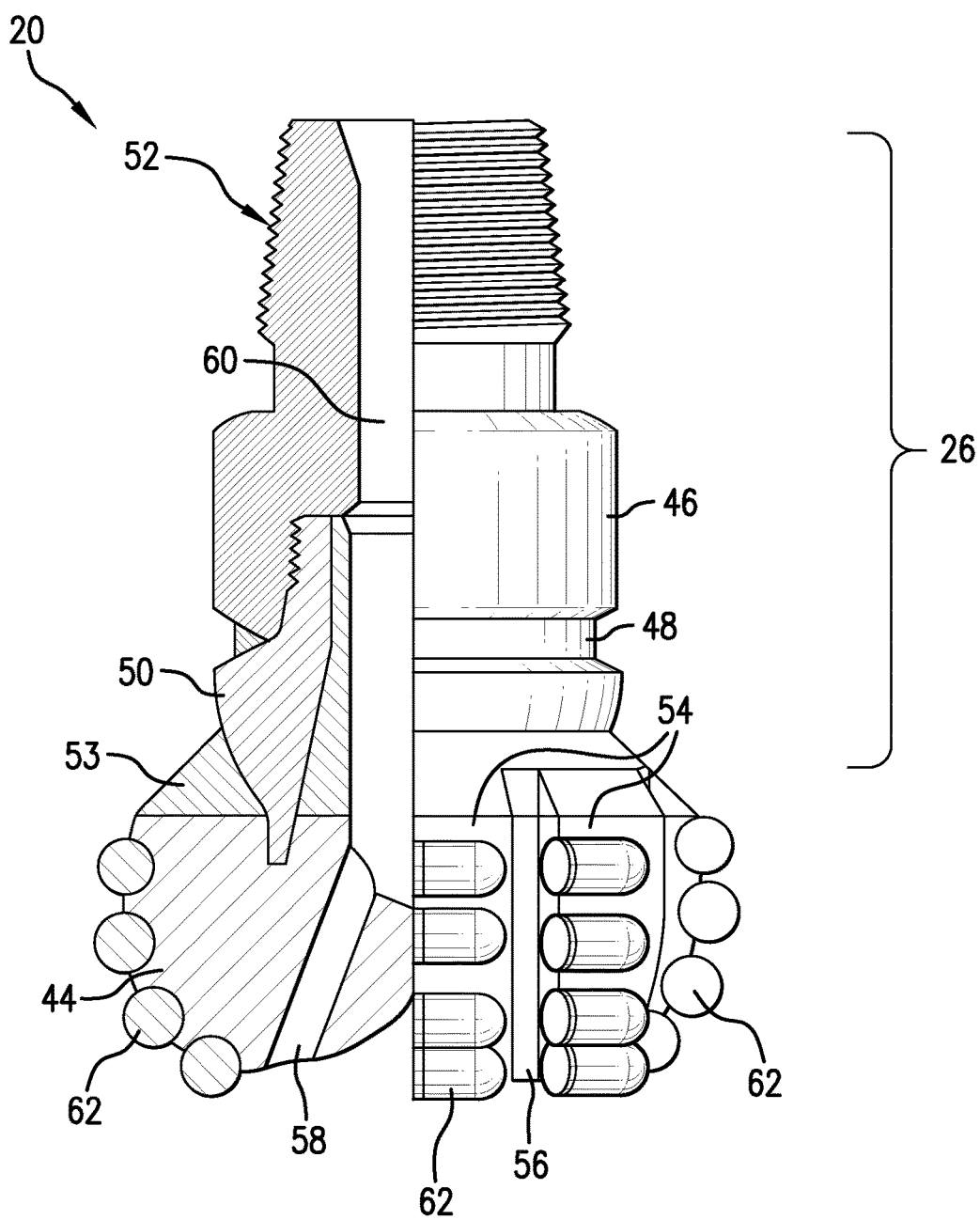
FIGS. 2A and 2B are perspective views of exemplary embodiments of a drill bit of the drilling system of FIG. 1.

An exemplary embodiment of an earth-boring rotary drill bit 20 is shown in FIG. 2A. The drill bit 20 includes a crown 44 and the bit body 26. The bit body 26 may include various structural components, such as a shank 46 secured to the crown 44 by a weld 48, a steel blank 50, and a connection mechanism such as a threaded connection 52 for operably connecting the drill bit 20 to the drillstring or other components such as the mud motor 28 or reamer 30. Other components include a bit gage 53 disposed adjacent to the crown 44. The bit gage 53 may include various components including gage pads and gage trimmers. Further examples of components include other components that rub or contact the borehole wall or formation material in general, such as Tracblocks, ovoids, wear knots and others.

The bit body 26 includes wings or blades 54, which are separated by external channels or conduits also known as junk slots 56. Internal fluid passageways 58 may be included that extend between an exterior of the crown 44 and a longitudinal bore 60 that extends through the bit body 26. A plurality of cutters 62 (e.g., PDC cutters) are disposed on the crown 44.

The embodiment shown in FIG. 2A is a fixed cutter bit such as polycrystalline diamond compact (PDC) bit. However, the drill bit 20 is not limited to the embodiments described herein, and may be any type or earth boring drill bit, such as a rotary drag bit or a roller cone bit.

Figure 2B:
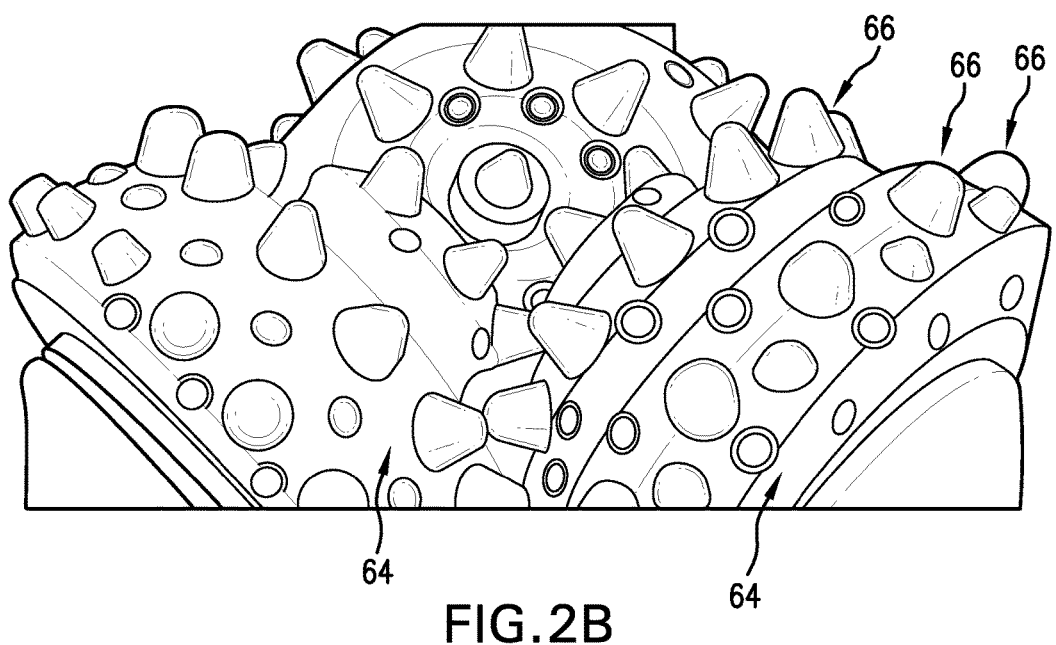
Figure 3:
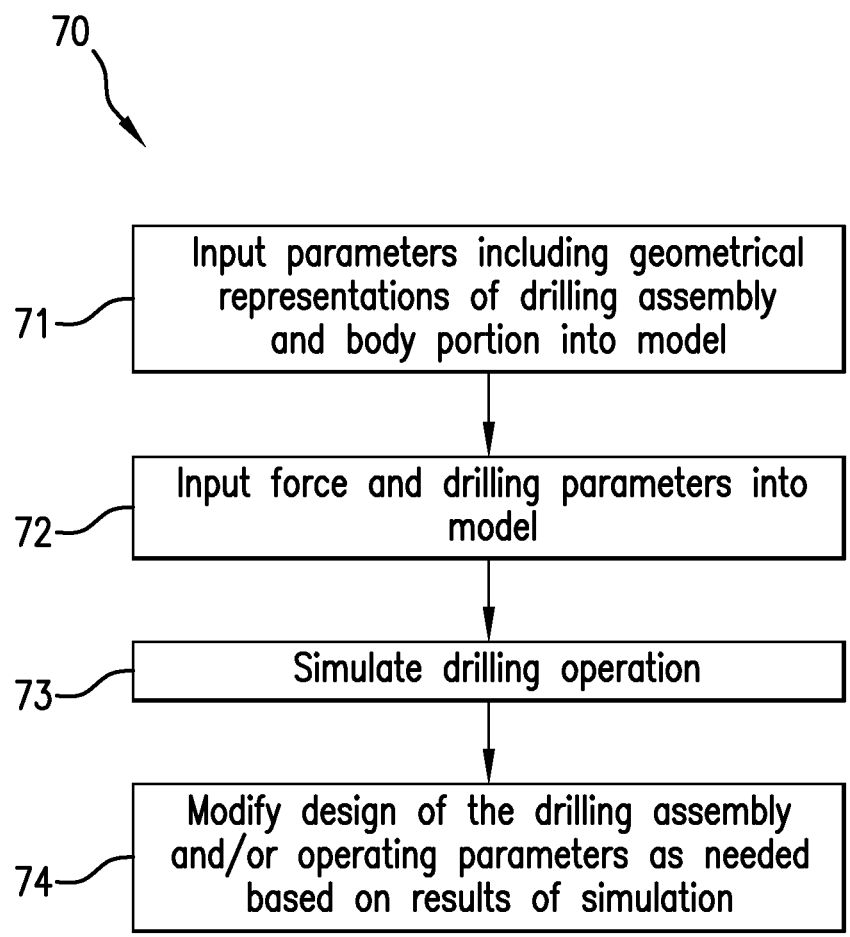
FIG. 3 is a flow chart representing an embodiment of a method of predicting and/or simulating behavior of a drilling assembly using a model of the drilling assembly.

For example, as shown in FIG. 2B, the drill bit 20 may include a rotary drill bit having cutters attached to roller cones. In this example, the bit body includes cone shells 64 and inserts 66 or other cutting elements that interact with the formation 16 during drilling. Referring to FIG. 3, a method 70 of predicting drill string assembly parameters and/or behavior is described. The method may be executed by a computer processing system (e.g., the processing unit 32) via programs or software for generating a drill string assembly dynamics model, which may be used to investigate or predict the performance and behavior of the assembly under selected downhole and drilling conditions.

Exemplary components of such a computer processing system include, without limitation, at least one processor, storage, memory, input devices, output devices and the like. At least portions of the method 70 may be performed using previously generated and stored data, or may be performed using real-time data generated during a subterranean operation or experimental operation of drilling components such as the drilling assembly 18. The method 70 includes one or more stages 71-74. In one embodiment, the method 70 includes the execution of all of stages 71-74 in the order described. However, certain stages may be omitted, stages may be added, or the order of the stages changed.

In the first stage 71, input parameters including geometric data (e.g., size and shape) describing the drilling assembly 18 are selected to be input into a mathematical model of the drilling assembly 18. The model uses the geometric data to generate representations of the geometry of one or more components of the drilling assembly 18 and interactions between drilling system components (e.g., bits, motors, thrusters, stabilizers, wellbore, drilling fluid), as well as interactions between the drilling assembly 28 and the borehole wall borehole fluid and/or formation materials, during drilling operations. The model is provided to allow users to simulate conditions and component interactions that are encountered during a drilling operation.

An exemplary simulation model is generated using the finite element method. In one embodiment, a plurality of node elements are generated from the geometric data that correspond to the shape or geometry of different portions of the drilling assembly 18.

In one embodiment, the drillstring assembly is modeled as a three-dimensional model using finite elements such as geometrically nonlinear beam or mass elements. Nodes are assigned for various components of the drill string assembly. For example, nodes may be provided to simulate the geometrical shape and density of the drill bit, cutters and various components of the drilling assembly and/or the drill string. Such components include the various support structures provided to physically and operably support the drill bit cutters and/or connect the cutters to the drill string. Exemplary components that may make up elements of the model include the drill bit body 26, the shank 46, the connector 52, blades, 54, the steel blank 50, roller cone shells 64, roller cone inserts 66, the gage 53, the mud motor 28 and the reamer 30. Other components include gage pads, gage trimmers, Tracblocks, ovoids, wear knots and others. In one embodiment, the model includes (e.g., as model elements) any components of the drilling assembly (including crown components and body components) that rub against the borehole wall or casing, or otherwise come into contact with formation material. In one embodiment, the model includes any surface or geometry on the bit body that is not comprised of cutters such as super-abrasive cutters. In one embodiment, the model includes a plurality of nodes corresponding to a configuration of the bit body 26. Nodes may be included for the drill string portion, the mud motor 28 and optionally one or more reamers 30.

In addition, the model may include input parameters relating to the formation and/or the borehole. For example, the diameter and direction of the borehole (e.g., azimuth and inclination) as well as changes in the borehole can be input into the model. Such borehole parameters can be taken from measurements taken during (e.g., real time) or after drilling, such as real-time caliper measurements. Such parameters may also be an output of the model and predict the borehole quality (e.g., hole spiraling). The prediction may include new azimuth and inclination, build rate etc.

This embodiment of the model provides superior accuracy of predictions by modeling the bit body structure(s) between the drill bit and the drill string, in addition to the drill string and the bit (e.g., crown and cutters). By modeling the structural support of the drill bit (the bit body), additional information regarding vibration, deformation and other behaviors may be derived that had been previously ignored. In addition, friction between components of the drilling assembly and the formation can be modeled, and different friction models can be applied to determine friction characteristics, such as Coulomb friction or Stribeck type friction characteristics. The model can be used to predict behaviors of rubbing surfaces so that such rubbing surfaces can be designed to improve drilling operations, e.g., to improve tool face control or steerability and reduce rubbing surface exposure to mitigate stick-slip. Also, additional frictional-damping can be designed to provide lateral stability. These and other benefits of rubbing surfaces can be optimized using the computer model.

Figure 4:
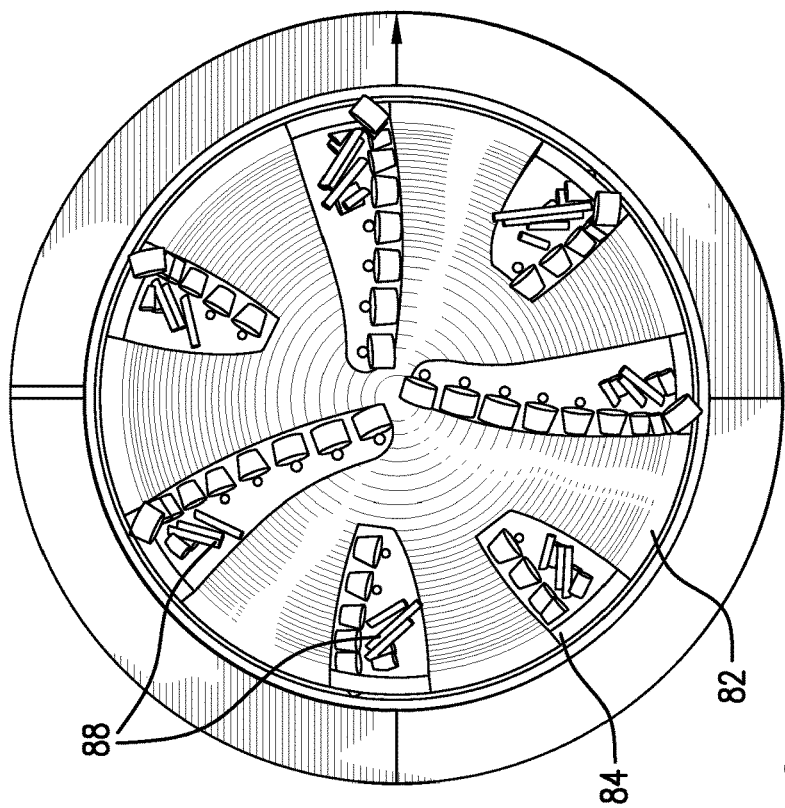
FIG. 4 is an illustration of a portion of an exemplary geometrical model of a drilling assembly.
Figure 4:
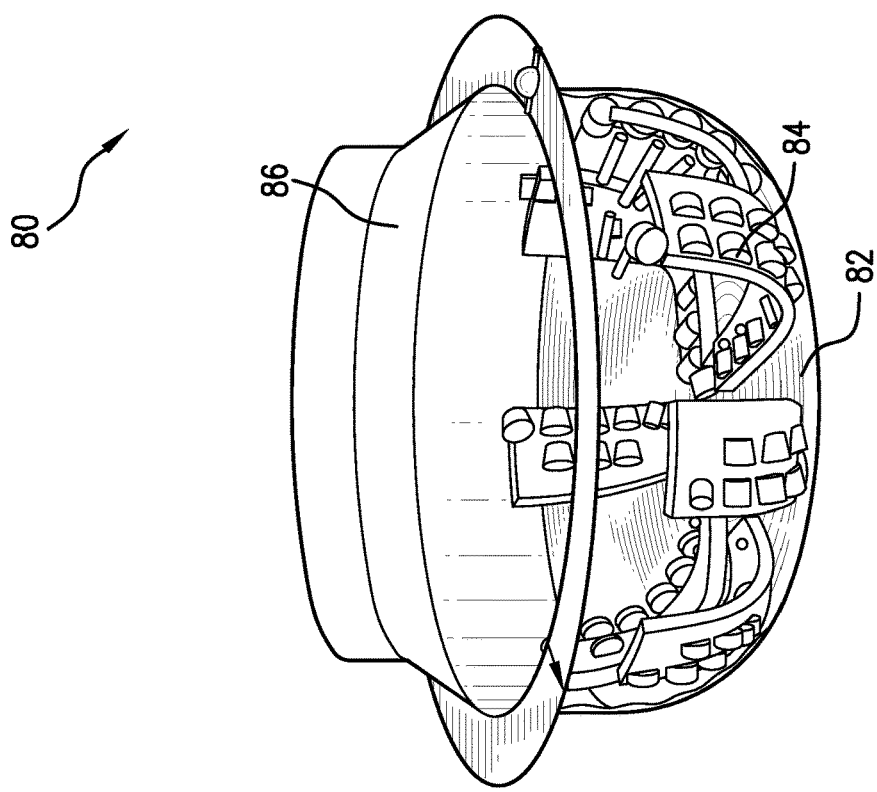
Figure 5:
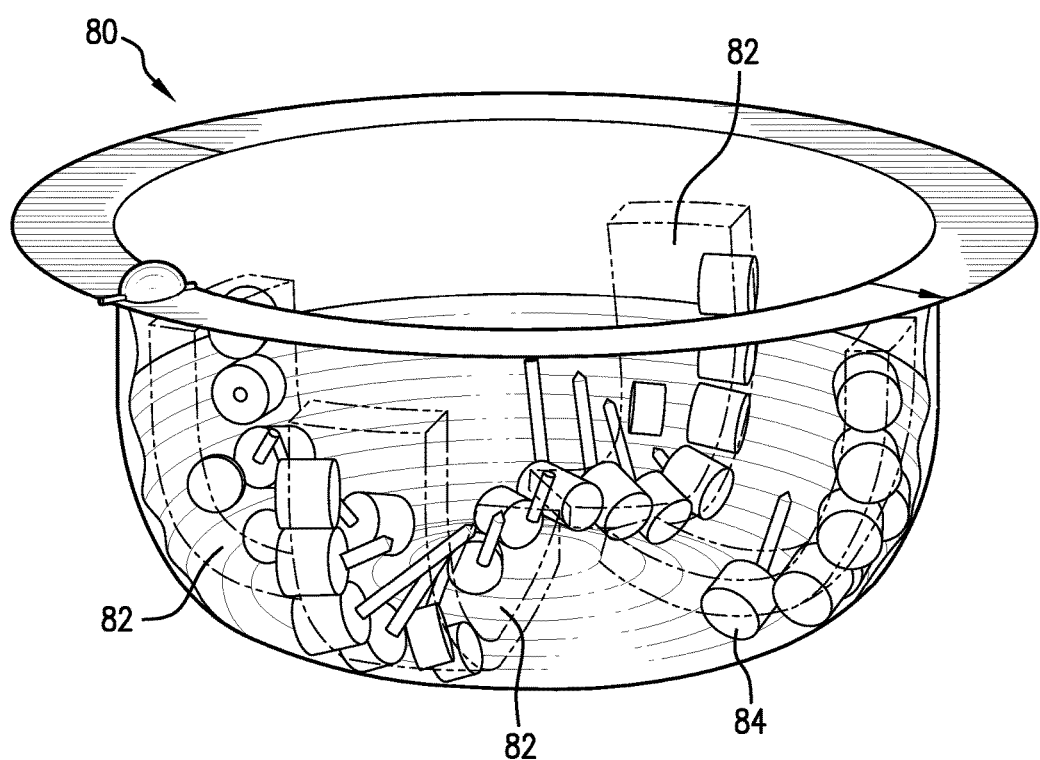
FIG. 5 is an illustration of a portion of an exemplary geometrical model of a drilling assembly.
Figure 6:
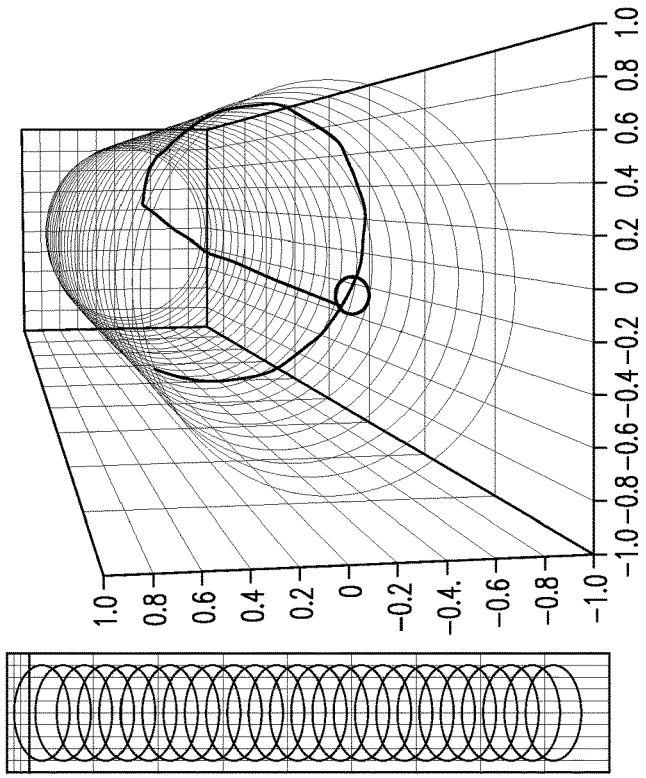
FIG. 6 is an illustration of an example of the model of FIG. 3, showing exemplary results of a simulation of drilling assembly behavior.
Figure 6:
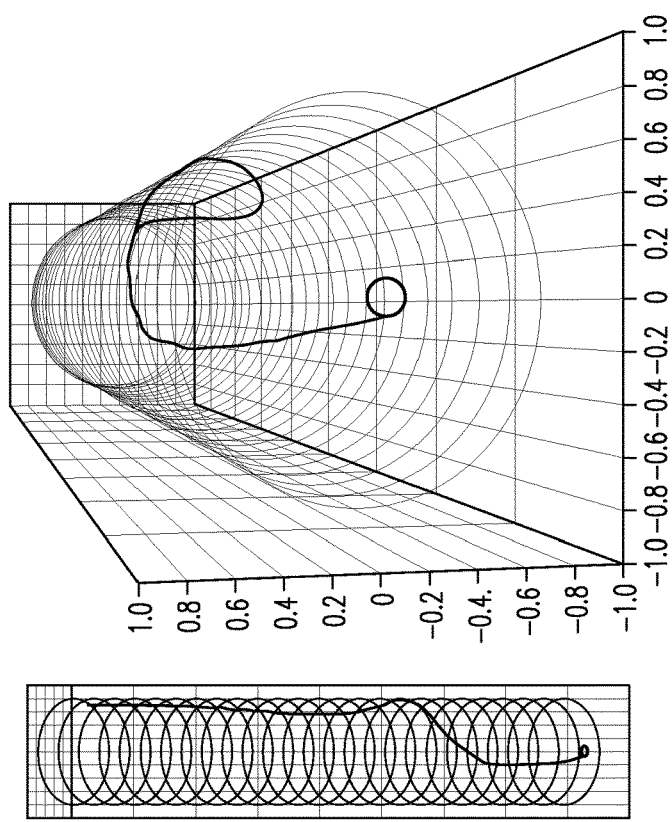

An example of a drilling assembly geometrical model is shown in FIG. 4. In this example, a finite element model 80 of components of the drilling assembly 18 is illustrated. The model 80 includes elements representing the cutters 84, and portions of a drill bit body 86, and other components 82. The model 80 may also show various forces 88 incident on the assembly. This example is only a partial example, as the model may include other components of the drilling assembly and additional forces and parameters on various components of the drilling assembly. FIG. 4 illustrates only a portion of the model 80, which may include other components such as a bit body, a bit blank and/or a bit gage. In one embodiment, the components 82 include any components of the drill bit assembly that come in contact with the borehole wall (and/or casing), formation materials and/or borehole fluids. For example, FIG. 5 illustrates an example of the finite element model 80, in which the components 82 are crown elements.

In one embodiment, each node in the model is given six degrees of freedom (three translations, three rotations), and is confined within an area representing the borehole 12 using for example a penalty function approach. Equations of motion can be used in conjunction with these degrees of freedom and may be integrated using an implicit or explicit, variable or fixed time step procedure.

For example, deformations of each node generated to represent the drilling assembly 18 are measured by three nodal displacements and three rotations noted as follows:

Lateral displacements: $u_1$, $u_2$
Lateral rotations: $\theta_1$ $\theta_2$
Axial displacement: $u_3$
Axial rotation: $\theta_3$ This formulation together with the geometrical nonlinearity enables the analysis of coupled lateral, axial and torsional vibrations in the frequency domain and the time domain, as well as the calculation of, e.g., buckling loads and post-buckling behavior.

In the second stage 72, various operational, drilling and force parameters are applied to the model to simulate a drilling operation. Systems of coupled, nonlinear equations of motion are used, which are integrated through time to obtain transient and steady state displacements, loads and stresses. Various input forces may be input such as weight-on-bit, drilling rotation speed, fluid pressure, mass imbalance forces, axial stresses, radial stresses, weights of various components, and structural parameters such as stiffness.

Other parameters that may be applied include parameters related to the interaction between the components of the model and the borehole environment, which includes a borehole wall, casing, borehole fluid and/or formation. Borehole fluid may include any type of fluid encountered in the borehole, such as drilling mud, steam, and fluids from the formation such as water, oil, gas and other hydrocarbons. Examples of such interaction parameters include rate of formation (e.g., rock) removal by components such as the cutters and the bit body. Including individual removal rates for different parameters provides additional detail, as the bit body may be responsible for some removal, and this removal can be modeled at a different rate than the cutters. Other interaction parameters includes forces experienced on the drilling assembly and/or drill string due to push-back from contact with the borehole wall, such as frictional forces experienced by different components of the model due to contact with the borehole wall, which generates additional torque on the drilling assembly. Other parameters include effects of interaction with the borehole wall on the drilling operation. For example, the rotation rate (e.g., RPM) or the rate of penetration can be limited due to contact between components of the drilling assembly and the borehole wall. The models are not limited to predicting frictional forces. For example, the interaction between the drilling assembly (e.g., rubbing surfaces of the body and crown) is not limited to modeling frictional forces. Any forces resulting from contact with rock and other formation materials can be modeled.

In one embodiment, using the degrees of motion and input force values, an exemplary nonlinear system of differential equations is derived:

$$\underline{M}\ddot{\underline{u}} + \underline{F}_F(\underline{u},\dot{\underline{u}}) + \underline{F}_W(\underline{u},\dot{\underline{u}}) + \underline{F}_G(\underline{U}) = \underline{R} + \underline{F}_E(\underline{u},\dot{\underline{u}},t) \qquad (3)$$

with
$\underline{u}$: dsplacements/rotations of nodes
$\underline{M}$: mass matrix
$\underline{F}_F$: distributed forces from the mud
$\underline{F}_W$: wall contact force
$\underline{F}_G$: nonlinear elastic forces
$\underline{R}$: static forces (weight, buoyancy, WOB . . . )
$\underline{F}_E$: exciation forces (mass imbalances, . . . )

The nodes and forces described herein are exemplary and not intended to be limiting. Any suitable forces desired to be modeled may be used.

The above equations are solved in the time domain to evaluate the dynamic response of the structures modeled by the nodes. In one embodiment, the equations are solved by a Newmark integration scheme. Other methods for solving the equations may be used, including but not limited to the finite difference method. In one embodiment, the equations may be solved in the frequency domain, for example to estimate lateral dynamics or provide details for static cases or steady state cases.

In the third stage 73, the simulated behavior of the modeled drill string assembly, generated from outputs of the model, is estimated. This behavior may be referred to as downhole dynamic events and may be classified as having one or more modes, such as axial events (e.g., bit bounce, Kelly bounce), lateral events, torsional events (e.g., Stick-slip) and whirl events.

Other behaviors include predictions of changes in the borehole (e.g., diameter, azimuth and inclination), as well as changes in borehole quality (e.g., spiraling, over gauge). The prediction may include outputs such as new azimuth and inclination, build rate and others.

The simulated behavior includes physical responses including (but not limited to) dynamic behavior of the drillstring/bit assembly, the static solution of the drillstring/bit assembly, the build-up rate of the drillstring/bit assembly in a given formation due to the dynamic behavior of the drillstring/bit assembly, and the build-up rate of the drillstring/bit assembly in a given formation due to the static solution of the drillstring/bit assembly.

Referring to FIGS. 5A and 5B, an exemplary model is shown that demonstrates the behavioral response of a modeled drilling assembly during a simulated drilling operation. In this example, results are shown for a system dynamics finite element model of a 7.875-inch IADC 627 bit on a slick BHA in vertical hole. The simulations examined drilling at a rate of penetration (ROP) of 10 ft/hr through hard rock at 45 RPM (shown in FIG. 4A) and 90 RPM (shown in FIG. 4B). The weight on bit (WOB) required to drill at this ROP was sufficient to buckle the collars, and the friction coefficient between collars and wellbore was high enough to generate backward whirl in the BHA. The side and front views at 45 RPM show the shape of the collars as they precessed around the hole. The upper portion of the BHA acted essentially like a rigid body at this slow speed. The side and front views at 90 RPM show a somewhat different result, as the BHA assumed a more helical shape. Although the models discussed herein relate to fixed cutter bits, they are not so limited. For example, the model could include components of a roller cone bit or a rotary drag bit.

In the fourth stage 74, in one embodiment, the input parameters are modified as necessary to change the design of the drill string (e.g., the drill bit, BHA and/or other drill string components) so that the simulated behavior is within selected limits. Such design changes may include shape or diameter of the bit body or other components of the drilling assembly, modification or inclusion of stabilizing structures on the bit body or drill string portion. Other design changes may include changing the weight, diameter, thickness and/or stiffness of tubular elements, and changing the side and/or front exposure of the cutters. Other parameters that can be changed include operating parameters such as rotational speed and weight on bit. After these parameters are changed, the behavior is again simulated to determine whether improvement and/or stability increase. Such design changes can be performed on the model and the model simulated in an iterative fashion to optimize the design of the drill string and/or the operating parameters, as well as optimizing designs of experiments and simulations (e.g., monte carlo simulation).

In one embodiment, the mathematical model is validated with measurements of motion or static parameters taken during operation of a drilling assembly. For example, during a drilling operation, a dynamic motion or static parameter is estimated via the model for a location at which a measurement is performed. The dynamic motion or static parameter is then compared to the measurement. If the difference between the estimated dynamic motion or the static parameter and the measurement is within a certain tolerance, then the mathematical model is validated. Loads such as forces or moments imposed on the drill string in the mathematical model can also be validated this way. The measurements may be updated on a continuous or periodic basis while the drilling assembly is operating. Sensors distributed at the drill string (i.e., operatively associated with the drill string), such as the sensors 40, may be used to provide the measurements of dynamic motion or the static parameter. Validation of the model can be performed after drilling or in real time during a drilling operation.

In another embodiment, the model may be used to simulate drill string assembly behavior prior to performing a drilling operation, in real time during a drilling operation and/or after a drilling operation is completed. For example, real time dynamic events may be measured by the sensors and transmitted to the processor, which applies these measurements to the model to evaluate the performance of the drill string assembly. The results of this application may be used to change drilling parameters or otherwise control the drilling operation via, for example, the processing unit 32. In one embodiment, generation of data or measurements in "real-time" is taken to mean generation of the data at a rate that is useful or adequate for providing control functions or making decisions during or concurrent with processes such drilling operations. Accordingly, it should be recognized that "real-time" is to be taken in context, and does not necessarily indicate the instantaneous determination of data, or make any other suggestions about the temporal frequency of data collection and determination.

The systems and methods described herein provide various advantages over prior art techniques. For example, models of the drilling assembly can be generated and tested that include a more complete description of the drilling assembly than has been achieved by prior art techniques, which typically limit models to include a drill string and a bit (i.e., the crown and one or more cutters). The systems and methods described herein provide more complete models including the bit body and other body portions of the drilling assembly (e.g., a mud motor), which leads to more realistic models and more accurate simulation results.

Generally, some of the teachings herein are reduced to an algorithm that is stored on machine-readable media. The algorithm is implemented by the computer processing system and provides operators with desired output.

In support of the teachings herein, various analysis components may be used, including digital and/or analog systems. The digital and/or analog systems may be included, for example, in the downhole electronics unit 42 or the processing unit 32. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force, or a rotational force), digital signal processor, analog signal processor, sensor, magnet, antenna, transmitter, receiver, transceiver, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of predicting behavior of a drilling assembly including a drill bit, comprising:
   generating a mathematical representation of a drill bit, the representation including a geometry of each of a plurality of cutters and a geometry of one or more non-cutting components of the drill bit, the one or more non-cutting components including at least a portion of a drill bit crown;
   simulating, by a processor, one or more operating conditions incident on the drilling assembly, and simulating contact between the drill bit and at least one of a borehole wall and an earth formation, wherein simulating contact includes:
   simulating interaction between the plurality of cutters and at least one of a borehole wall and an earth formation using a first interaction parameter associated with forces experienced by the plurality of cutters, wherein the plurality of cutters are simulated as a first component to which the first interaction parameter is applied;
   simulating interaction between the one or more non-cutting components of the drill bit and at least one of a borehole wall and an earth formation using a second interaction parameter associated with different forces experienced by the one or more non-cutting components, the second interaction parameter associated with frictional forces experienced by surfaces of the one or more non-cutting components due to rubbing against at least one of the borehole wall and the formation, wherein the non-cutting components of the drill bit are simulated as a separate component to which the second interaction parameter is applied, the first interaction parameter and the second interaction parameter including different rates of formation material removal;
   predicting physical responses of the drilling assembly to the one or more operating conditions and the simulated contact; and
   controlling the drilling assembly based at least in part on the predicted physical responses.

2. The method of claim 1, wherein the drill bit crown has the cutters attached thereto.

3. The method of claim 1, wherein the mathematical representation is a finite element model, and generating the mathematical representation includes generating a plurality of nodes, the plurality of nodes representing the geometry.

4. The method of claim 1, wherein the one or more non-cutting components includes a drill bit body.

5. The method of claim 4, wherein the drill bit body includes at least one of a drill bit gage, a gage pad, a drill bit shank, a gage trimmer, a Tracblock, an ovoid and a wear knot.

6. The method of claim 1, wherein the one or more operating conditions includes at least one of a drilling parameter, a force, a load, a moment, and a torque.

7. The method of claim 1, wherein the physical responses include dynamic behavior of the drill string and drilling assembly, a static solution of the drill string and drilling assembly, a build-up rate of the drill string and drilling assembly in a formation due to the dynamic behavior, and a build-up rate of the drill string and drilling assembly in the formation due to the static solution.

8. A computer program product for predicting behavior of a drill string assembly including a drill bit, the computer program product including a non-transitory tangible storage medium readable by a processing circuit and storing instructions for execution by the processing circuit for performing a method comprising:

generating a mathematical representation of a drill bit, the representation including a geometry of each of a plurality of cutters and a geometry of one or more non-cutting components of the drill bit, the one or more non-cutting components including at least a portion of a drill bit crown;

simulating one or more operating conditions incident on the drilling assembly, and simulating contact between the drill bit and at least one of a borehole wall and an earth formation, wherein simulating contact includes:

simulating interaction between the plurality of cutters and at least one of a borehole wall and an earth formation using a first interaction parameter associated with forces experienced by the plurality of cutters, wherein the plurality of cutters are simulated as a first component to which the first interaction parameter is applied;

simulating interaction between the one or more non-cutting components of the drill bit and at least one of a borehole wall and an earth formation using a second interaction parameter associated with different forces experienced by the one or more non-cutting components, the second interaction parameter associated with frictional forces experienced by surfaces of the one or more non-cutting components due to rubbing against at least one of the borehole wall and the formation, wherein the non-cutting components of the drill bit are simulated as a separate component to which the second interaction parameter is applied, the first interaction parameter and the second interaction parameter including different rates of formation material removal;

predicting physical responses of the drilling assembly to the one or more operating conditions and the simulated contact; and controlling the drilling assembly based at least in part on the predicted physical responses.

9. The computer program product of claim 8, wherein the mathematical representation is a finite element model and generating the mathematical representation includes generating a plurality of nodes, the plurality of nodes representing the geometry.

10. The computer program product of claim 8, wherein the one or more non-cutting components includes a drill bit body.

11. The computer program product of claim 10, wherein the drill bit body includes at least one of a drill bit gage, a gage pad, a drill bit shank, a gage trimmer, a Tracblock, an ovoid and a wear knot.

12. A system for estimating a behavior of a drilling assembly including a drill bit during a drilling operation, the system comprising:

a drilling assembly including at least a drill bit connected to a drill string, the drilling assembly configured to be disposed in a borehole;

a plurality of sensors operatively associated with the drilling assembly; and a processor in communication with the plurality of sensors, the processor configured to perform:

generating a mathematical representation of a drill bit, the representation including a geometry of each of a plurality of cutters and a geometry of one or more non-cutting components of the drill bit, the one or more non-cutting components including at least a portion of a drill bit crown;

simulating one or more operating conditions incident on the drilling assembly, and simulating contact between the drill bit and at least one of a borehole wall and a formation, wherein simulating contact includes:

simulating interaction between the plurality of cutters and at least one of a borehole wall and an earth formation using a first interaction parameter associated with forces experienced by the plurality of cutters, wherein the plurality of cutters are simulated as a first component to which the first interaction parameter is applied;

simulating interaction between the one or more non-cutting components of the drill bit and at least one of a borehole wall and an earth formation using a second interaction parameter associated with different forces experienced by the one or more non-cutting components, the second interaction parameter associated with frictional forces experienced by surfaces of the one or more non-cutting components due to rubbing against at least one of the borehole wall and the formation, wherein the non-cutting components of the drill bit are simulated as a separate component to which the second interaction parameter is applied, the first interaction parameter and the second interaction parameter including different rates of formation material removal;

predicting physical responses of the drilling assembly to the one or more operating conditions and the simulated contact; and controlling the drilling assembly based at least in part on the predicted physical responses.

13. The system of claim 12, wherein the mathematical representation is a finite element model, and generating the mathematical representation includes generating a plurality of nodes, the plurality of nodes representing the geometry.

14. The system of claim 12, wherein the one or more non-cutting components includes a drill bit body.

15. The system of claim 12, wherein the plurality of sensors are configured to measure downhole parameters associated with the drilling assembly, and the processor is configured to input the downhole parameters to simulate the physical responses of the drilling assembly representation.

16. The system of claim 12, wherein the plurality of sensors are configured to measure downhole parameters associated with the drilling assembly, and the processor is configured to receive the downhole parameters and compare the downhole parameters to the physical responses to validate the mathematical representation.

* * * * *